US007350696B2

(12) United States Patent
Frerking

(10) Patent No.: US 7,350,696 B2
(45) Date of Patent: *Apr. 1, 2008

(54) METHOD AND APPARATUS FOR EMPLOYEE ACCESS TO A GAMING SYSTEM

(75) Inventor: Gary Frerking, Henderson, NV (US)

(73) Assignee: Aristocrat Technologies Australia, Lane Cove NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/463,481

(22) Filed: Aug. 9, 2006

(65) Prior Publication Data

US 2007/0021197 A1    Jan. 25, 2007

Related U.S. Application Data

(63) Continuation of application No. 10/963,058, filed on Oct. 12, 2004, now Pat. No. 7,159,765.

(51) Int. Cl.
*G06K 7/00* (2006.01)

(52) U.S. Cl. ....................... 235/375; 235/487; 235/382

(58) Field of Classification Search ................ 235/375, 235/377, 380, 382, 487; 463/29; 705/18; 713/186
See application file for complete search history.

(56) References Cited

U.S. PATENT DOCUMENTS

| 6,396,438 | B1 | 5/2002 | Seal |
| 6,709,333 | B1 | 3/2004 | Bradford et al. |
| 6,761,637 | B2 | 7/2004 | Weston et al. |
| 6,836,472 | B2 | 12/2004 | O'Toole et al. |
| 6,892,938 | B2* | 5/2005 | Solomon ..................... 235/375 |
| 6,945,870 | B2* | 9/2005 | Gatto et al. ................... 463/29 |
| 2002/0142831 | A1* | 10/2002 | Mattice et al. ................ 463/29 |
| 2003/0036425 | A1 | 2/2003 | Kaminkow et al. |
| 2003/0195037 | A1 | 10/2003 | Vuong et al. |
| 2004/0259633 | A1* | 12/2004 | Gentles et al. ................ 463/29 |
| 2005/0077995 | A1* | 4/2005 | Paulsen et al. .............. 340/5.6 |

OTHER PUBLICATIONS

International Search Report.

* cited by examiner

*Primary Examiner*—Thien M. Le
*Assistant Examiner*—Edwyn Labaze
(74) *Attorney, Agent, or Firm*—Phil Anderson; McAndrews Held & Malloy

(57) ABSTRACT

Certain embodiments of the present invention provide a radio frequency identification system and method for facilitating access to a gaming environment. Certain embodiments include an employee identification device transmitting an identification signal in response to an interrogation signal, a gaming system including gaming functions and administrative functions, and a reader positioned with respect to the gaming system transmitting an interrogation signal and receiving the identification signal for access to the gaming system. The employee identification device may include a radio frequency identification (RFID) device, for example. The reader may include an RFID reader, for example. The gaming system may also prompt for at least one of a pass code and biometric identification for access to the gaming machine. In an embodiment, the reader facilitates an end to access to the gaming system after an interval without receiving an identification signal.

20 Claims, 2 Drawing Sheets

METHOD AND APPARATUS FOR EMPLOYEE ACCESS TO A GAMING SYSTEM

CROSS-REFERENCE TO RELATED APPLICATIONS

This is a continuation of Ser. No. 10/963,058, filed on Oct. 12, 2004, now U.S. Pat No. 7,159,765 which is herein incorporated by reference in its entirety.

BACKGROUND OF THE INVENTION

The present invention generally relates to a gaming system. In particular, the present invention relates to an improved employee identification device for a gaming system.

Gaming workstations, such as a jackpot and fill workstation or other control or administrative gaming station, are typically found in casinos or other gaming environments. Gaming workstations may be located on a casino floor, for example, and behind the scenes in a control room or administrative area, for example. Gaming workstations help manage, maintain, and/or upgrade gaming machines and other systems in the gaming environment. Employees often access gaming workstations for tasks such as checking gaming machine status, player tracking, jackpot notification, inputting and retrieving other information, etc.

Current workstations require manual log in and log out by employees. Employees often remain "logged in" at a gaming workstation and leave the workstation unattended. Unattended, "logged in" workstations represent a significant security risk in a gaming environment. Thus, a system for improved secure access to gaming workstations would be highly desirable.

Additionally, certain gaming systems such as servers or workstations containing particularly sensitive data such as binary game images or the like may require a higher level of security than that afforded by authorizing the access of a single employee. Thus, a system for ensuring that more than one employee is present at the gaming system prior to authorizing access to the gaming system would be highly desirable.

Gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments.

A gaming machine providing entertaining and enticing features for players would be highly desirable to attract both new and returning players to a gaming establishment. Additionally, a gaming machine that allows customization and dynamic modification by an operator would be highly desirable to provide new features to customers.

Current gaming machines are difficult to reconfigure and offer the same game to multiple users at multiple gaming establishments. Changing a gaming machine or system to a different game or format involves time-consuming and difficult procedures by an operator.

Additionally, configuration of a gaming machine or workstation by an operator raises concerns regarding security of data and integrity of the gaming machine or workstations That is, gaming establishments and legal authorities place high priority on the integrity of a game, such as a slot or poker game. Thus, there is a need for a gaming system that allows configurability and reparability while maintaining a secure environment.

Furthermore, repairs to a gaming machine, workstation or other gaming system are often time-consuming. Certain repairs may involve removing a machine from circulation in a casino. Removing a gaming system from operation negatively impacts operation of the casino and may discourage patrons. Thus, a system for improved repair or maintenance of a gaming system would be highly desirable.

Thus, there is a need for an improved employee identification device for a gaming system that allows a casino employee secure access to the gaming system.

BRIEF SUMMARY OF THE INVENTION

Certain embodiments of the present invention provide a system and method for improved access in a gaming environment. Certain embodiments of a system include a radio frequency identification (RFID) reader transmitting an interrogation signal within an area, and a RFID tag receiving the interrogation signal and transmitting a response signal to the RFID reader. The RFID reader facilitates authorization for access in a gaming environment based on the response signal.

In an embodiment, the system further includes a database for verifying the response signal to authorize access in the gaming environment. The system may also include a gaming system associated with the RFID reader, wherein the RFID reader facilitates access to the gaming system using the RFID tag. In an embodiment, the gaming system prompts a user for a pass code and/or biometric identification for access to the gaming system. In an embodiment, the gaming system requires a plurality of RFID tags and associated pass codes and/or biometric identification for access to the gaming system.

In an embodiment, the RFID reader facilitates disabling the access after a certain interval with an absence of the RFID tag or tags authorizing access. The RFID reader may poll for a presence of the RFID tag, for example. The RFID reader may facilitate access to the gaming environment by a plurality of users using a plurality of RFID tags. In an embodiment, the RFID reader facilitates access to administrative functions in the gaming environment based on the RFID tag.

Certain embodiments of a radio frequency identification system for facilitating access to a gaming environment include an employee identification device transmitting an identification signal in response to an interrogation signal, a gaming system including gaming functions and administrative functions, and a reader positioned with respect to the gaming system transmitting an interrogation signal and receiving the identification signal for access to the gaming system. The employee identification device may include an RFID device, for example. The reader may include an RFID reader, for example.

In another embodiment the employee identification device may be active, i.e. powered, to periodically transmit a unique identification signal to the reader.

In an embodiment, the system further includes a central authority for verifying the response signal to authorize access to the gaming system. The gaming system may also prompt for at least one of a password/pass code and biometric identification for access to the gaming system. The gaming system may also require that more than one employee be present for access to the gaming system. The reader may facilitate authorization for access to administrative functions, such as supervisory and maintenance functions, at the gaming system. In an embodiment, the reader facilitates an end to access to the gaming system after an interval without receiving an identification signal.

Certain embodiments of a method for allowing access in a gaming environment include transmitting an interrogation signal, generating an identification signal in response to the interrogation signal, authorizing access to a gaming system based on the identification signal, and maintaining access to the gaming system based on the identification signal. In an embodiment, the interrogation signal is a radio frequency interrogation signal and the identification signal is a radio frequency identification signal. The method may also include obtaining a pass code and/or biometric identification for access to the gaming system. The method may also require more than one employee for access to the gaming system such as providing a witness, verification or security. The method may further include authorizing access to administrative functions at the gaming system. In an embodiment, access to the gaming system is terminated after an interval without receiving an identification signal.

Certain embodiments of the present invention include a system in a gaming environment of the type including a plurality of gaming terminals at which players may engage in gaming activity, at least one central processor linked to the terminals to receive, store and download data related to the operation of the terminal and/or the player and at least one workstation located remote from and linked to the central processor for communication therewith. The system includes an electromagnetic signal transmitter in possession of a person authorized to operate the workstation to communicate with the central processor, where electromagnetic signal is configured to be unique for each authorized person. The system also includes a receiver to receive an electromagnetic signal from a transmitter when an authorized person is proximate the workstation. The system further includes an interface for the person to input authorization data of at least one of a password and data corresponding to a unique biometric feature of the person, one of the central processor and workstation configured to, from the electromagnetic signal and input of one of the password and data corresponding to a unique biometric feature of the person, authorize the person to have access to the central processor. The system includes a transceiver for periodically transmitting the signal to confine that the authorized person remains proximate the workstation. Additionally, the system includes a central processor configured to terminate authorization upon the failure to confine that the authorized person remains proximate the workstation.

In an embodiment, the receiver and the transceiver comprise a single transceiver. In an embodiment, the electromagnetic signal transmitter is a transponding tag in possession of the person and the receiver is configured to include means for periodically issuing an interrogation signal, where the tag is configured to send the electromagnetic signal in response to the interrogation signal. The tag may include machine readable data corresponding to the password, and the workstation may include a machine to read the data to authorize the person to have access to the central processor. The workstation may include a biometric input device for the person to input biometric data. In an embodiment, one of the workstation or host processor configured to, from the electromagnetic signal and input of one of the password and data corresponding to a unique biometric feature of the person, authorize a plurality of persons to have common access to the central processor, wherein the transceiver periodically transmits the signal to confirm that the authorized persons remain proximate the workstation, and wherein the central processor is configured to terminate authorization upon the failure to confirm that any confirmed authorized person remains proximate the workstation.

Figure 1:
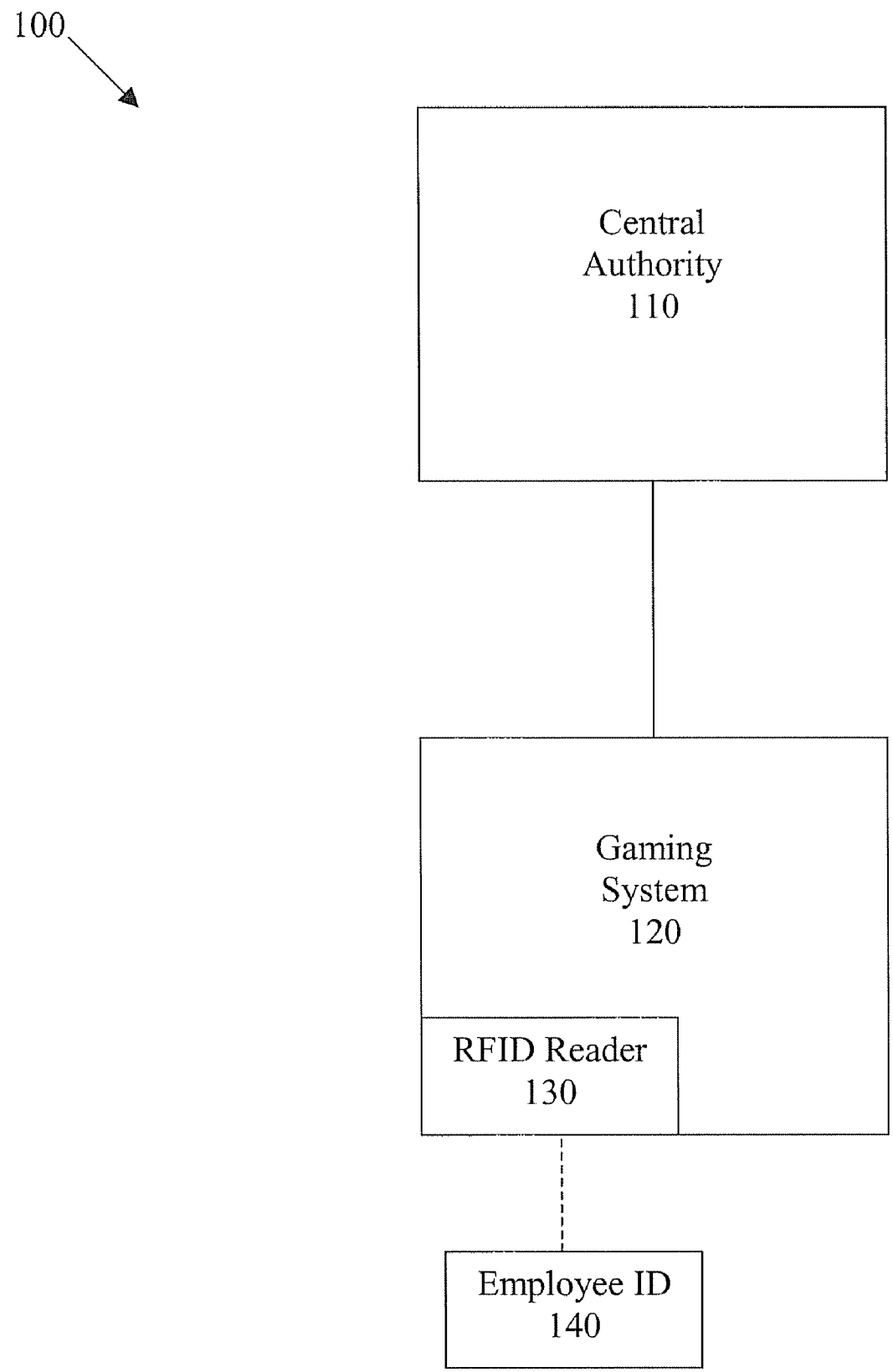
FIG. 1 illustrates an improved casino network system used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a casino network system 100 used in accordance with an embodiment of the present invention. The system 100 includes a central authority 110, a gaming system 120, an RFID reader 130, and an employee identification device 140. The casino network system 100 may include a plurality of gaming systems 120, readers 130, and identification devices 140.

The components of the system 100 are connected via a wired and/or wireless network. The RFID reader 130 transmits an interrogation signal to the identification device 140. The interrogation signal may be a radio frequency signal, an electromagnetic signal, a microwave signal, an infrared signal, or other communication signal, for example. The reader 130 is connected to the gaming system 120 and transmits data to the gaming system 120. The reader 130 may be separate from or integrated with the gaming system 120. For example, the reader 130 may be part of a gaming machine console or positioned on or adjacent to a gaming machine or gaming system. As another example, the reader 130 may be integrated into a button, handle, or other components of a gaming machine, for example. The gaming system 120 is in network communication with the central authority 110. The network may be a dedicated network, a local area network, and/or a wide area network. The network may be a wired or wireless network. The central authority 110 may be integrated with or separate from the gaming system 120. The components of the system 100 may communicate using standard protocols.

The central authority 110 is a server or other computer system providing services and/or storage to the system 100. The central authority 110 may provide a number of different services, including accounting services, player tracking services, progressive game services, browsing services, cashless play services, etc. The applications may be written in various languages including, for example, C#, Java, or SQL. The operating system for example, is a Windows® brand operating system or UNIX-based system which provides conventional functions.

Central authority 110 may also transmit information to various subscribers including gaming system 120. For example, gaming system 120 may subscribe to a "bonus time" alert. Central authority 110 notifies gaming systems that have subscribed that a bonus period has started and that jackpots are to be paid out at twice the pay table, for example. The central authority 110 may provide such a bonus service in real time with the bonus event, or provide a scheduled command for future bonus events. The central authority 110 may also broadcast an end of a bonus event or tournament, for example.

Central authority 110 includes a plurality of functions that may be called by other systems or devices in network communication with the central authority 110. Such functions include conventional method or function calls as well as remote calls, e.g., proxy and simple object access protocol (SOAP)/extensible markup language (XML) invocations.

Central authority 110 may also provide data to or retrieve data from a database. For example, data is stored as to gaming activity, player account information, advertisements, ticketing, etc. For example, meter data is received by central authority 110. Central authority 110 stores the meter data in a database. Also, data is retrieved including player information, accounting data, application programs, etc.

The gaming system 120 is an electronic gaming machine, an access workstation, a jackpot and fill workstation, a control workstation, data input and display device, cash register, a gaming terminal, a gaming device, or other gaming system, for example, referred to collectively herein as a gaming system 120. The gaming system 120 may be used to allow a customer or casino patron to play a game, such as a slot machine game, video poker game, or other game. The gaming system 120 may also be used for casino management, player/employee tracking or loyalty, food or beverage service, security, and/or accounting, for example.

The gaming system 120 and other gaming systems communicate with the central authority 110 via a network. Data is transmitted over the network between the gaming systems and central authority 110, which is formed of one or more computers. Each gaming system may include a smart communications interface (SCI) for control of communications over the network. Central authority 110 may store game output data (received from the gaming systems) and may store game input data (to be sent to the gaming systems) in a central database.

In an embodiment, a gaming system 120, such as an electronic gaming machine, includes a housing that supports a number of components including a main display which is positioned on the outer front face of the gaming system 120 for direct presentation of a display to the player. An input area receives a wager from the player in the form of currency bills or bar-coded vouchers. A card receiving slot is positioned to receive a player or employee card to identify the particular person at the gaming system, as described hereinafter. A secondary display also may be included, for the display of supplemental non-game information to the player, typically, in the form of instructions, points balances, or other information. An employee may view game configuration or maintenance information, for example, on the secondary display. As understood, all or part of supplemental display may take the form of a display window located on primary display or a secondary window on display.

A keypad is provided to allow the player or employee to input data to the SCI of the gaining system, particularly in response to instructions or questions on supplemental display. In addition, a plurality of decision-making buttons are used by the player to play the game machine. A payout tray provides an area for redemption of awards based on play of the game, and a printer may be used to print tickets or other redemption documents.

The gaming system 120 may include a number of peripheral devices including, for example, a card reader and key pad. The card reader and key pad may be used to identify a player or employee at the gaming system 120. A casino issues a player a player card through an application process. The player card typically includes a magnetic strip that is encoded with data to identify the player. In some cases, a personal identification number (PIN) is given to the player for security, and may allow access to certain features of the gaming machine. The card is readable by a card reader found in a gaming machine, workstation or other gaming system. Other types of cards may be utilized including optical cards, smart cards, RFID devices, biometric devices, etc.

In addition, a unique number or symbol may be encoded onto a magnetic stripe, barcode, or other indicator carried by the card. This unique number or symbol corresponds to a player account file which is maintained by central authority 110 in a database. The account file may include information such as the player's name, address, amount of credit available, amount of promotional credits, amount of loyalty points, etc.

Employees of a gaming establishment, such as a casino, may have employee cards that are insertable into a gaming workstation or other gaming system or otherwise scanable or readable by a gaming workstation or other gaming system. The employee card may include a magnetic strip that is read upon insertion to alert an SCI that an employee is present at the gaming system. The card may also include a RFID transmitter that transmits a signal in response to the reader 130. If an employee is verified, then particular functions of the gaming system (or SCI) are made available to the employee.

In an embodiment, when an employee card is inserted into a reader or scanned by the reader 130, SCI recognizes the card as an employee card. Employee menus or options, such as a supervisory mode or a maintenance mode, are then displayed on a display at the gaming system, such as the gaming system 120.

An RFID device, such as the RFID reader 130, uses radio waves, electromagnetic waves, or other wireless communication, for example, to identify an item, such as the employee identification device 140. For example, the employee identification device 140 may be a card including a microchip with a coiled antenna. The microchip in device 140 may comprise a fixed, read-only memory or a variable, read-write memory capable of storing new data transmitted by reader 130, for example. The card may be an employee card, a floor card, a mechanic card, a meter comparison card, a currency card, a player card, or other card, for example. The identification device 140 may also be a ring, a bracelet, a necklace, or other accessory with an RFID tag, for example. The RFID reader 130 may also include a microchip with an antenna. The RFID reader 130 transmits electromagnetic waves or pulses that form a magnetic field when the waves combine or "couple" with the antenna at the device 140.

A passive RFID tag at the identification device 140 draws power from the magnetic field and uses the power from the field to power the microchip. An active RFID tag is powered by a battery, for example. The microchip modulates the waves received from the RFID reader 130 and transmits the modulated waves back to the reader 130. The reader 130 converts the received waves into digital data identifying the device 140.

In an embodiment, the microchip at the employee identification device 140 stores a serial number or other identification number or code that identifies the device 140. The device 140 may also store additional information regarding the device 140 and/or an employee associated with the device 140. The antenna enables the microchip to transmit the identification information to the RFID reader 130 through modulated waves. Various techniques may be used to avoid interference from other devices. The waves may be transmitted back to the reader 130 at the same or at a different frequency. The reader 130 converts the received waves into identification information for processing and/or transmission by the gaming system 120 and/or the central authority 110.

In operation, for example, an employee wears a badge with an embedded RFID tag, such as the employee identification device 140. A gaming system, such as a gaming system workstation or gaming machine, is equipped with a device, such as the RFID reader 130, to detect the presence of the employee based on the RFID tag. The reader 130 detects the identification device 140 and allows the employee to access the gaming system 120. The reader 130 may automatically allow the employee to access the gaming system 120 or may require a password, pass code, authentication code, biometric identification, or key, for example, to access the gaming system 120. The reader 130 may allow access to certain features of the gaming system 120 based on information from the device 140. The biometric information may be a scan of the employee's face, palm, finger tip, eye(s) or the like. In an embodiment, identification data may be locally cached or held for a period of time or until a certain event occurs. This selves to minimize unintentional communication of identification codes received by the reader 130 from employees simply passing by or standing next to the gaming system 120. The data may be locally stored until, for example, (1) the employee inputs the password, code, and/or biometric information to complete the authorization of the employee, whereupon the data is sent to the central authority or other system for confirmation; or (2) the expiration of a time period without the input of the information indicating that the employee was a passerby, whereupon the data is not transmitted. Alternatively, the casino floor may be mapped to the central authority 110 such that if an employee's tag 140 is identified by multiple readers 130 in succession, the central authority determines that employee is moving past the gaming systems rather than intending to interface with a gaming system 120. The mapping feature may be used to track and store employees' movements for security, time motion analysis and/or other business or security purpose, for example.

After the employee has finished his or her tasks at the gaming system 120, the employee may exit or "log out of" the gaming system 120. Alternatively, if the RFID reader 130 does not detect the presence of the one or more employee identification device(s) 140 for more than a certain period of time, then the reader 130 may instruct the gaming system 120 to automatically end the employee's session at the gaming system 120. Alternatively, the reader 130 and/or the gaming system 120 may prompt the employee or employees to re-enter a password/pass code, insert or turn a key, or otherwise affirm continuation of the current employee session, for example.

In an embodiment, the reader 130 or the gaming system 120 polls the employee identification device or devices 140 to ensure the presence of the device(s) 140 at the gaming system 120. If polling does not detect the device(s) 140 after an interval or certain number of attempts (for example, two attempts), then the gaming system 120 may end the employee session.

In another embodiment, if the reader 130 detects more than one employee identification device 140 at the gaming system 120, any of the detected employees are allowed to access the system. For example, if two employees have been authorized to have access to a workstation at the same time and one of the authorized employees departs the location (thus resulting in a termination of the responding/transponding signal at the system 120), the departed employee will be logged off, and the remaining employee will remain logged on.

In another embodiment, if more than one employee identification device 140 is required for authorized access to the gaming system 120 and the reader 130 detects the required number of employee identification devices 140 at the gaming system 120, the employees are allowed to access the system 120. For example, if two employees must be present to gain access to the system and any one of the authorized employees departs the location resulting in a termination of the responding/transponding signal, the departed employee as well as the remaining employee will be logged off the gaming system 120. This feature may be applicable in situations where, for example, company or regulatory procedures require a witness or the presence of two authorized persons to conduct an operation. In this regard the system, where different employees have different authorization powers, may be configured so as to require the presence of two or more persons with the required authorization levels.

In an embodiment, the identification device 140 and the RFID reader 130 may be used, possibly in conjunction with the employee inputting a proper password or other data required to confirm authorization, to unlock doors, access certain areas, read gaming meters, and verify authorization, for example. The tags 140 and system 120 may be configured to provide for different levels of authorization. For example, personnel whose task it is to empty a cash/ticket validator at a gaming machine may only be able to authorize the opening the doors required to gain access to the validator cash/ticket storage bin. Other personnel may be authorized to open the machine in response to a call for repair; other personnel may have access to pay/record the payment of jackpots while others may have blanket access.

Authorization levels may be stored at the central authority 110 and/or other authorization system. Authorization level may be determined by a record in a database, a password or code, biometric data, and/or presence of one or more RFID tags 140, for example. For example, an employee may have multiple RFID tags 140. Multiple tags 140 may be required for the employee to access the gaming system 120, and/or multiple tags 140 may allow the employee incremental levels of access at the gaming system 120. Tags 140 may be employee-specific and/or task-specific, for example. Multiple tags 140 may provide the central authority 110 and/or other system with various information identifying the individual, an intended task, a level of access, and/or other information, for example. Multiple tags 140 may allow a tag 140 for verification of access to the gaming system 120 as well as another tag 140 with read/write capability for storing data from and/or adding data to the system 120, central authority 110, and/or other system, for example.

Figure 2:
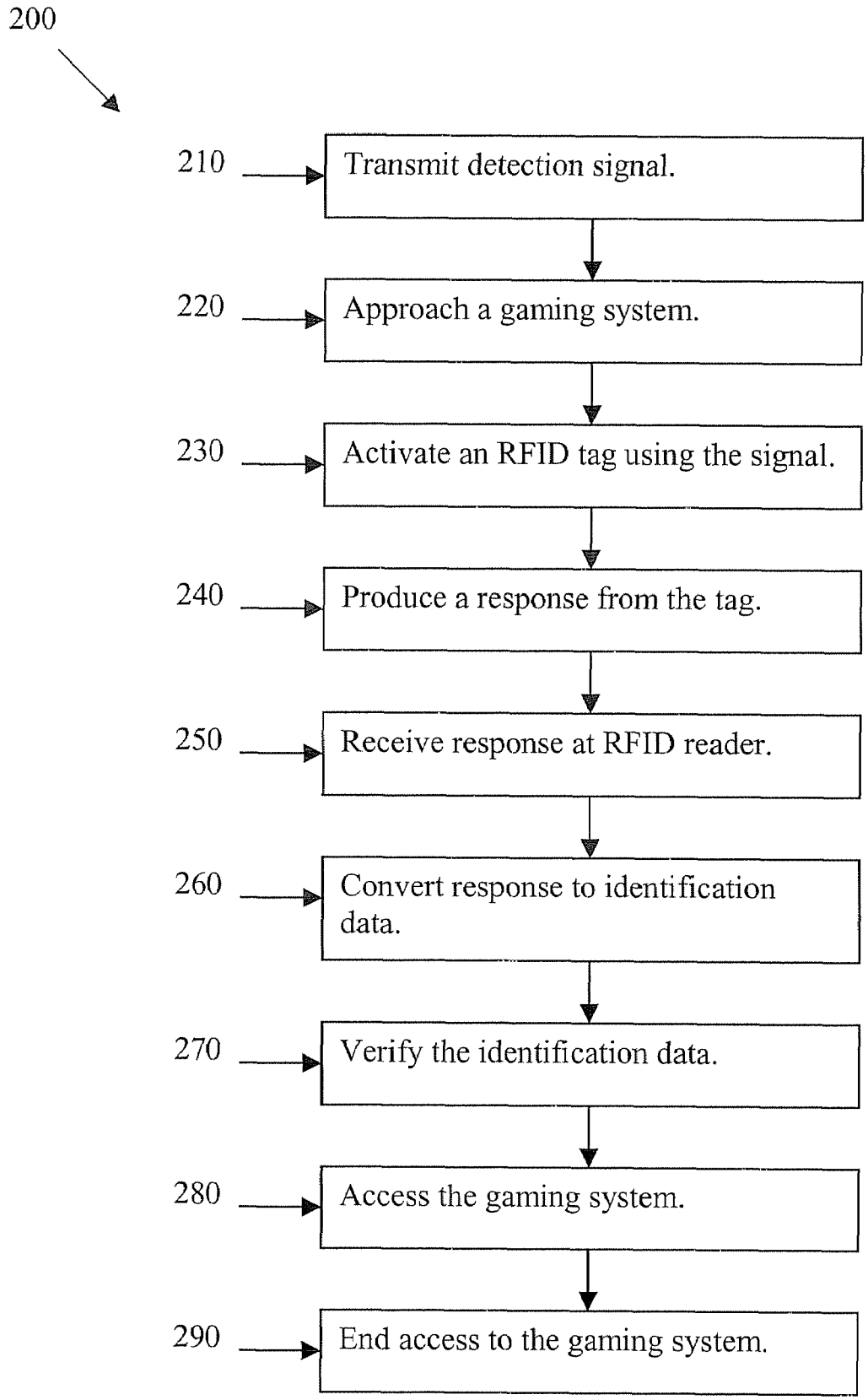
FIG. 2 illustrates a flow diagram for a method for improved access to a gaming system in accordance with an embodiment of the present invention.

FIG. 2 illustrates a flow diagram for a method 200 for improved access to a gaming system in accordance with an embodiment of the present invention. First, at step 210, an RFID reader 130 transmits a signal within a certain radius of a gaming system or other location. For example, the RFID reader 130 broadcasts electromagnetic waves within three feet of a gaming machine. Then, at step 220, a user approaches the gaming system. For example, a casino employee walks up to a gaming machine.

Next, at step 230, the transmitted signal activates an RFID tag. For example, the electromagnetic wave impacts an RFID tag on an employee identification badge. At step 240, the RFID tag produces a response. For example, the RFID tag on the employee badge modulates the received electromagnetic wave and directs the modulated wave back to the RFID reader 130.

Then, at step 250, the RFID reader 130 receives the response. For example, the RFID reader 130 detects the modulated electromagnetic wave. At step 260, the received response is converted to identification data. For example, the modulated electromagnetic wave is translated into a number identifying a casino employee.

Next, at step 270, the identification data is verified. For example, the employee number may be checked against a database of employee identification numbers to determine that the number represents a valid employee identification number. Furthermore, the database may include a level or area of access for the employee to allow verification that an employee is allowed to access a certain area or level of control, for example.

Then, at step 280, the employee may access the gaming system. For example, the employee initiates a maintenance session and accesses a system maintenance menu to correct a program at the gaming machine or upgrade the gaming machine. At step 290, access to the system is concluded. For example, an employee may complete a task and log out of the system. Alternatively, the employee may walk away from the machine, and the machine may log out the employee after a certain period of time. In an embodiment, multiple employees may choose to or may be required to access a single gaming system according to the method 200.

Thus, certain embodiments allow access without or in addition to insertion of an access card at a gaming system. Using a badge or other device with an RFID tag, transmitter or receiver, a user's access may be authenticated without insertion or other physical presentation of identification in the gaming system 120 or reader 130. Thus, a player card may remain inserted at the gaming system 120 while an employee accesses features at the gaming system 120 using the identification device 140. Once the employee is done with maintenance or configuration at the gaming system 120, play may continue. Thus, certain embodiments provide enhanced security along with increased flexibility at gaming workstations, electronic gaming machines, and other gaming systems.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system including gaming terminals, the system including a processor in communication with the terminals to interact therewith and with an employee workstation, said workstation configured to require a log on input to enable the workstation to be operated by an authorized person and a log out input to disable the workstation, the system comprising:
   (i) an electromagnetic signal transmitter in position of each employee authorized to operate the workstation, each transmitter configured to issue a unique signal;
   (ii) a receiver configured to at least periodically receive an electromagnetic signal from a transmitter when an authorized person is proximate the workstation; and
   (iii) an interface for an authorized person to input password data at the workstation, one of said workstation and processor configured to, from the electromagnetic signal and input of password data place said workstation in an enabled condition and place the workstation in a disabled condition to said authorized person when said signal is not received by said receiver.

2. The system of claim 1, wherein at least one of said workstation and processor is configured to place the workstation in a disabled condition to said authorized person when said signal is not received by said receiver for a time period.

3. The system of claim 1, wherein said transmitter and receiver are a transceiver.

4. The system of claim 1, wherein said transmitter comprises a transponder in possession of the authorized person and said receiver is configured to periodically issue an interrogation signal, said transponder configured to send said electromagnetic signal in response to said interrogation signal.

5. The system of claim 1, wherein said authorized person is authorized to access administrative functions at the workstation when said signal is at least periodically received by said receiver.

6. The system of claim 1, further comprising a central authority for verifying at least one of said signal and said password data to authorize access by said authorized person to said workstation.

7. The system of claim 1, wherein said disabled condition comprises a log out of said workstation.

8. The system of claim 1, wherein access to administrative functions at a gaming terminal by said authorized person is facilitated by said transmitter and said receiver.

9. In a system including gaming terminals linked to a central processor and a secure system workstation, a method for an authorized person to enable the workstation for the person to interface with the system and to disable the workstation, the method comprising:
   (i) issuing an electromagnetic transmitter to each authorized person, each transmitter configured to issue a unique signal;
   (ii) at least periodically receiving at a receiver proximate the workstation said transmitter signals when an authorized person is proximate the workstation;
   (iii) the authorized person inputting password data at the terminal to, in combination with receipt of a corresponding signal, place the workstation in an enabled condition; and
   (iv) placing the workstation in a disabled condition upon non-receipt of said signal by said receiver.

10. The method of claim 9, further comprising placing the workstation in a disabled condition upon non-receipt of said signal by said receiver for a predetermined time period.

11. The method of claim 9, further comprising issuing an electromagnetic signal transponder to each authorized person, each transponder configured to issue a unique signal and periodically sending from said receiver an interrogation signal, said transponder in response to said interrogation signal issuing said electromagnetic signal.

12. The method of claim 9, wherein said disabled condition comprises a log out of said workstation.

13. The method of claim 9, further comprising authorizing access to a gaming terminal by said authorized person based on said signal.

14. The method of claim 9, further comprising verifying at least one of said signal and said password data via an external system to authorize access by said authorized person to said workstation.

15. A method for allowing administrative access in a gaming environment, said method comprising:
    transmitting an interrogation signal;
    generating an identification signal in response to said interrogation signal;
    authorizing administrative access to software on a gaming system based on said identification signal; and
    maintaining said administrative access to said gaming system based on presence of said identification signal.

16. The method of claim 15, wherein said interrogation signal comprises a radio frequency interrogation signal and said identification signal comprises a radio frequency identification signal.

17. The method of claim 15, further comprising obtaining at least one of a pass code and biometric identification for access to said gaming system.

18. The method of claim 15, further comprising authorizing access to administrative functions at said gaining system.

19. The method of claim 15, further comprising termination of access to said gaming system after an interval without receiving an identification signal.

20. The method of claim 15, wherein said authorizing step further comprises authorizing access to said gaming system based on a plurality of identification signals.

* * * * *